United States Patent [19]
McMahon

[11] Patent Number: 5,956,658
[45] Date of Patent: *Sep. 21, 1999

[54] PORTABLE DATA COLLECTION APPARATUS FOR COLLECTING MAINTENANCE DATA FROM A FIELD TOUR

[75] Inventor: Stephen William McMahon, Linlithgow, United Kingdom

[73] Assignee: Diagnostic Instruments Limited, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/889,275

[22] Filed: Jul. 8, 1997

Related U.S. Application Data

[62] Continuation of application No. 08/738,174, Oct. 28, 1996, abandoned, which is a continuation of application No. 08/651,324, May 31, 1996, abandoned, which is a continuation of application No. 08/433,487, filed as application No. PCT/GB94/01918, Sep. 5, 1994, abandoned.

[30] Foreign Application Priority Data

Sep. 18, 1993 [GB] United Kingdom .................... 9319360

[51] Int. Cl.$^6$ .................................................. G01B 21/00
[52] U.S. Cl. ................................ 702/83; 702/33; 702/61; 702/182; 235/376; 235/472
[58] Field of Search .............................. 364/550, 551.01, 364/551.02, 506, 508; 73/658, 660, 661; 235/375, 376, 472; 346/14 MR, 33 R; 340/870.01, 870.02, 870.07, 870.16, 870.17; 702/33–35, 44, 54, 56, 61, 62, 68, 81, 83, 84, 127, 128, 182, 184, 185, 187–189

[56] References Cited

U.S. PATENT DOCUMENTS

| | | | |
|---|---|---|---|
| 4,612,620 | 9/1986 | Davis et al. ...................... | 364/551.01 |
| 4,621,263 | 11/1986 | Takenaka et al. ................. | 340/870.07 |
| 4,800,512 | 1/1989 | Busch ................................ | 364/551.01 |
| 4,827,771 | 5/1989 | Cary et al. ................................ | 73/661 |
| 4,839,854 | 6/1989 | Sahami et al. ...................... | 346/144 R |
| 4,885,707 | 12/1989 | Nichol et al. ..................... | 364/551.01 |
| 5,142,128 | 8/1992 | Perkin et al. ........................... | 235/376 |
| 5,166,499 | 11/1992 | Holland et al. ........................ | 235/376 |
| 5,309,351 | 5/1994 | McCain et al. ........................ | 364/550 |
| 5,321,629 | 6/1994 | Shirata et al. ........................ | 364/550 |
| 5,331,136 | 7/1994 | Koenck et al. ........................ | 235/375 |
| 5,399,844 | 3/1995 | Holland ................................ | 364/402 |
| 5,461,222 | 10/1995 | Haneda ................................ | 235/375 |

FOREIGN PATENT DOCUMENTS

A 0 436 961   7/1991   European Pat. Off. .
A 34 40 254   6/1986   Germany .

OTHER PUBLICATIONS

International Search Report, PCT/GB94/01918, Nov. 24, 1994.

*Primary Examiner*—Hal Dodge Wachsman
*Attorney, Agent, or Firm*—Bell Seltzer Intellectual Property Law Group of Alston & Bird LLP

[57] ABSTRACT

A data collection system (20) is described which includes a hand-held data collector (22) for connecting to a computer processing station (PC) (24) which has software which provides a grouping of machines, from which data is to be collected, which are not ordered in a predetermined or measurement sequence. The grouped information is downloaded from the PC (24) to the data collector (22) and, once in the data collector, the user lists or rearranges the grouping as desired using the keys of the data collector to specify a desired sequence in the field. This means that the user is able to create the sequence of measurements "live", that is on tour or during the route.

9 Claims, 14 Drawing Sheets

FIG. 1.

CONFIGURE MEASUREMENT POINT [49]

| Field | Ref |
|---|---|
| Start of Header | SOH |
| Sequence No. | 00-FF |
| Packet type byte | 49 |
|  | STX |
| Point Number | (7.1) |
| US |  |
| Channel Number | (7.2) |
| US |  |
| Point ID | (7.3) |
| US |  |
| Machine ID | (7.4) |
| US |  |
| Train ID | (7.32) |
| US |  |
| Point Description 1 | (7.5) |
| US |  |
| Point Description 2 | (7.5) |
| US |  |
| Point Counter | (7.6) |
| US |  |
| Measurement Type | (7.7) |
| US |  |
| Input Type | (7.8) |
| US |  |
| Point Type | (7.9) |
| US |  |
| Hardware Settings | (7.10) |
| US |  |
| Alarm Flag | (7.13) |
| US |  |
| Detection Flag | (7.14) |
| US |  |
| Reserved (2 Bytes) | (5.6.3) |
| US |  |
| Frequency 1 | (7.16) |
| US |  |
| Frequency 2 | (7.16) |
| US |  |
| Time Average No. | (7.17) |
| US |  |
| Alarm Level 1 | (7.18) |
| US |  |
| Alarm Level 2 | (7.18) |
| US |  |
| Sensitivity | (7.20) |
| US |  |
| Order/SBA No. | (7.21) |
| US |  |
| Collect Flag | (7.22) |
| US |  |
| Spectral Lines | (7.24) |
| US |  |
| Frequency Range | (7.25) |
| US |  |
| Signature Setup | (7.26) |
| US |  |
| Process Average No. | (7.27) |
| US |  |
| Valid Level 1 | (7.27) |
| US |  |
| Valid Level 2 | (7.28) |
| US |  |
| Mode | (7.33) |
| US |  |
| Ext. Trigger Level & Slope |  |
| US |  |
| Reserved (2 Bytes) | (5.6.3) |
| ETX |  |
| mm |  |

FIG. 5.

| SELECT ORDER | | |
|---|---|---|
| ONLY_TRAIN | MACHINE_000 | M |
| ONLY_TRAIN | MACHINE_001 | M |
| ONLY_TRAIN | MACHINE_003 | M |
| ONLY_TRAIN | MACHINE_002 | M * |
| ONLY_TRAIN | MACHINE_004 | M |
| ONLY_TRAIN | MACHINE_005 | M |
| ONLY_TRAIN | MACHINE_006 | M |
| ONLY_TRAIN | MACHINE_007 | M |
| ONLY_TRAIN | MACHINE_008 | M |
| ONLY_TRAIN | MACHINE_009 | M |
| ONLY_TRAIN | MACHINE_010 | M |
| ONLY_TRAIN | MACHINE_011 | M |
| ONLY_TRAIN | MACHINE_012 | M |
| ONLY_TRAIN | MACHINE_013 | M |
| ONLY_TRAIN | MACHINE_014 | M |
| ONLY_TRAIN | MACHINE_015 | M |
| ONLY_TRAIN | MACHINE_016 | M |
| 01/02 | * * current M/C in tour | |

| PICK | SAVE | RCALL | HOME | PT | CONT |

FIG. 8a.

| SELECT ORDER | | |
|---|---|---|
| ONLY_TRAIN | MACHINE_000 | M |
| ONLY_TRAIN | MACHINE_001 | M |
| ⇨ ONLY_TRAIN | MACHINE_002 | M * ⇦ |
| ONLY_TRAIN | MACHINE_003 | M |
| ONLY_TRAIN | MACHINE_004 | M |
| ONLY_TRAIN | MACHINE_005 | M |
| ONLY_TRAIN | MACHINE_006 | M |
| ONLY_TRAIN | MACHINE_007 | M |
| ONLY_TRAIN | MACHINE_008 | M |
| ONLY_TRAIN | MACHINE_009 | M |
| ONLY_TRAIN | MACHINE_010 | M |
| ONLY_TRAIN | MACHINE_011 | M |
| ONLY_TRAIN | MACHINE_012 | M |
| ONLY_TRAIN | MACHINE_013 | M |
| ONLY_TRAIN | MACHINE_014 | M |
| ONLY_TRAIN | MACHINE_015 | M |
| ONLY_TRAIN | MACHINE_016 | M |
| 01/02 | * * current M/C in tour | |

M/C: ONLY_TRAIN  MACHINE_002

| PLACE | SAVE | RCALL | HOME | PT | CONT |

FIG. 8b.

P#: 19 of 210
TOUR: BIG PLANT TEST
TRAIN: ONLY_TRAIN
MACHINE: MACHINE_002
POINT: INDEX_018_000
TYPE: ACCEL
RANGE: 0.100 G
DESC: Point Desc #1...
Point Desc #2...

[←P] [←M] [Notes] [M→] [P→] [Read]

FIG. 9.

```
OFFTOUR P#: 1-OT

TRAIN         FIRST_TRAIN
    MACHINE       8111 - SPINDLE
    ID            OT-1
    TYPE          ACCEL
    DETECT        PEAK
    RANGE         5 G
    CALIB         50.000
    ALARM TYPE    ABOVE
    ALARM1        3.300067
    ALARM2        1.999939
    COLLECT       SIGNATURE ALWAYS
    COUPLE        ACCEL
SIGNATURE PAGE

[←P] [    ] [STORE] [DEL] [P→] [READ]
```

NOTES          1/1

0: Machine Normal
1: Not Operating
2: Fluctuating Vibration
3: Hot Bearing
4: Bad Belts
5: Abnormal Noise
6: Leaks
7: Loose Parts
8: Low Oil Level
9: Overhaul/Repair Use Cursor Keys to Select
Press <ENTER> to Change esc

FIG. 18.

PORTABLE DATA COLLECTION APPARATUS FOR COLLECTING MAINTENANCE DATA FROM A FIELD TOUR

This application is a continuation of U.S. application Ser. No. 08/738,174, filed Oct. 28, 1996, now abandoned, which is a continuation of U.S. application Ser. No. 08/651,324, filed May 31, 1996, now abandoned, which is a continuation of U.S. application Ser. No. 08/433,487, filed Jul. 12, 1995, now abandoned, which corresponds to International Application PCT/GB94/01918, filed Sep. 5, 1994.

FIELD OF THE INVENTION

The present invention relates to data collection apparatus for use as part of a predictive maintenance system. In particular, the invention relates to a hand-held data collector for use with PC-based control software. The PC-based control software is used to set up a database of points or locations to be measured during a tour or route in the plant, to trend the measurements which are made and to transfer measurement information to and from the data collector apparatus. The hand-held data collector is taken out into the plant and used to gather data and the results are sent back to the PC for subsequent examination.

BACKGROUND OF THE INVENTION

Data collectors are used as part of a predictive maintenance system to perform measurements on a regular basis, for example daily, weekly or monthly, of certain machine parameters, such as vibration levels, at critical points within a train of machines. Variations in the measurements of a period of time at each point can be examined for upward trends and this allows predictions to be made of the likely time of failure and hence allows the efficient planning of maintenance. Typical uses of such data collectors are in the process industries where unexpected failure of one machine can mean much lower production.

U.S. Pat. No. 4,612,620 to Davis et al describes apparatus for collecting scheduled maintenance data in accordance with a predetermined schedule. The apparatus includes a portable data collector which can be coupled to a PC. The apparatus is operable in either a data input or program mode and is coupled with a vibration transducer which is located at predetermined coded positions and data collected is stored in memory. In addition, with this system visual inspection data can be entered in the memory in the form of a numerical code along with units, designations and the like. In the data input mode of operation, the apparatus operates in conjunction with a scheduling facility which off-loads the schedule during a transfer mode into the apparatus at the commencement of any given maintenance round. The schedule serves to prompt the operator as to the sequence of data collection locations, additionally providing units, alarm threshold levels and like information. At the end of the schedule rounds, the data may be off-loaded to the processing facility. The apparatus includes logic which permits analysis of the type of transducer as the automatic carrying out of alarm level comparisons.

The hand-held instrument may be combined with a computerised predictive maintenance scheduling and data processing facility. When so combined a scheduled round of measurement procedures may be automatically transmitted to the memory of the instrument by the PC. Once this happens, the operator of the hand-held instrument receives a sequence of prompts which are read-out at the collector display as it is carried to progressive machine measurement positions. These prompts follow the predetermined maintenance schedule of the processor facility and, in the course of such activity, the operator is further provided with on-site alarm indications and the like, where appropriate. At the end of the route the data collector is again connected to the PC and the information obtained, i.e. the measurements, are uploaded to the PC. Once a"route" has been set up in the PC it will typically be used many times and be transferred to and from the data collector on every such occasion. In practice, a predetermined sequence of measurements as defined by the PC is normally followed but in special circumstances this can be deviated from. For example, if a particular machine is not working, then the measurements for that machine can be skipped, there is a facility in the Davis et al data collector to do this. It is necessary to set the information up on the PC because of the volume of measurements required and the number of units from which data is to be collected. The PC allows management of this information because in some situations there can be as many as 400 points from which data measurements are required and, consequently, the route is easily set up on the PC. In addition, during the scheduled round of a plant additional measuring points can be included which can be uploaded with the route measurements. These additional measurements are termed "off-tour" measurements.

The whole thrust of the aforementioned Davis et al patent is towards providing the operator with a predetermined maintenance schedule so that the operator follows the schedule as downloaded to the hand-held unit and takes measurements of each machine in turn.

SUMMARY OF THE INVENTION

A significant disadvantage of the Davis et al apparatus is that the operator is constrained to carrying out the tour of the plant in the same sequence as is downloaded, i.e. the predetermined maintenance schedule.

This may not be the most efficient way of conducting a particular tour and can lead to lost time and does not cater for situations wherein the machine environment has been changed, for example, the machines have been relocated in a particular plant. Furthermore, this apparatus does not allow the operator in the field the flexibility of deciding how best to conduct the tour once he has inspected the plant.

An object of the present invention is to obviate or mitigate the aforementioned disadvantages of prior art structures.

A further object of the present invention is to provide a hand-held data collector which allows the user in the field to create the desired sequence with the flexibility of changing the sequence to ensure efficient collection of field data.

This is achieved by providing a data collection system which includes a hand-held data collector and PC-based control software. The PC-based control software provides a grouping of machines which is not ordered in a predetermined selection or measurement sequence. The grouped information is downloaded from the PC to the data collector and, once in the data collector, the user lists or rearranges the grouping as desired using the keys of the data collector to specify a desired sequence in the field. This means that the user is able to create the sequence of measurements"live", that is on tour or during the route. Also, the user can store the current sequence in memory. Thus a number of different sequences can be stored in memory and recalled by the user if this is desired. The terms tour and route are used interchangeably throughout the specification. British terminology uses"tour", while American terminology uses "route".

This results in a significant advantage in that the user can follow the created sequence and has the flexibility to change the sequence and upload the information to suit particular conditions of a plant. This live editing feature is a significant advantage over existing data collection systems because it uses instant information in the plant to provide accurate and efficient sequencing.

According to a first aspect of the present invention, there is provided a data collection system for collecting maintenance data from a plurality of machines, said data collection system comprising:

computer processing means for setting up a database of points to be measured on a particular tour, and to transfer measurement information to and from data collection means, a hand-held data collector unit having a housing and connector means for enabling said hand-held data collector unit to be operationally coupled to said computer processing means, said hand-held data collection means having visual display means for displaying visual information about said tour and about a particular machine, keyboard means operable by a user for collecting data from each machine in turn and for arranging the sequence of measurements to be made during the tour and data collector memory means for storing the list of machines to be measured and for storing measurement data from each machine measured, the arrangement being such that in use, when said hand-held data collector is coupled to said computer processing system a list or grouping of machines to be measured is downloaded from said processor memory to said data collector memory, the user actuates said keyboard means to organise the grouping or list of machines stored in said data collector memory in a tour sequence for obtaining measurement data from each of said plurality of machines in turn, said measurement data being stored in said data collector memory means and being transferrable from said data collector memory means to said computer processing unit on completion of said tour.

Preferably, said hand-held data collector unit includes slot means for receiving a memory card or disk with a list of points to be measured, and means for reading said memory card or disk to transfer said information to said data collector memory, means for transferring measurements made during said tour to said memory card or disk, said memory card being removable and connectable to said computer processing unit whereby a hardwire link between said data collector and said computer processing unit is not required. In other words, the list of machines can be downloaded by a removable memory card or disk and in the same way the measurements taken during the tour can be uploaded to the PC.

Conveniently, said grouping or listing of machinery to be measured is arranged in an alphabetical or numerical list.

In accordance with another aspect of the present invention there is provided a hand-held data collector for use by an operator as part of a predictive maintenance system, said hand-held data collector comprising, a housing, a keyboard disposed in the housing, a visual display for displaying machine and measurement information, the hand-held data collector being adapted to be connected to a computer processing apparatus, said data collector having memory means for receiving a grouping or list of machines to be monitored and for storing maintenance data from said machines which are monitored.

Preferably, said means for inputting data to said memory means is a removable memory card which is first programmed with a list or group of machines in the said computer processing unit and then inserted into a receiving slot in said data collector. Conveniently, said memory card receives said maintenance data from said data collector and can be removed from said data collector and inserted. into said computer processing apparatus where bias and maintenance data can be retrieved for trend analysis.

According to a further aspect of the present invention, there is provided a method of collecting data from a plurality of machines for use in a predictive maintenance system, said method comprising the steps of, providing a database of machines to be measured, transferring from the database a list of machines to be measured to a hand-held data collector, the list of machines not being arranged in a predetermined measurement sequence, arranging the list or group of machines to be measured into a created tour sequence, conducting a tour of the machines in accordance with the created sequence and obtaining measurement data from each of said plurality of machines measured in accordance with said created tour sequence, storing the created tour sequence with the corresponding measurement data from each machine in the memory of said data collector, and transferring said created measurement data from said data collector memory to computer processing means.

Preferably, the method includes the step of storing the arranged list in memory for recall at a later time.

Preferably, said database of machines to be measured is a grouping of machines in a random order. Alternatively, the machines are listed numerically or alphabetically.

Preferably, said data is downloaded and uploaded between a computer processing means to a hand-held data collector by a hardwire link. Alternatively, the data is transferred between said portable data collector and said computer processing means by a removable memory card.

BRIEF DESCRIPTION OF THE DRAWINGS

These and other aspects of the present invention will become apparent from the following description when taken in combination with the accompanying drawings in which:

FIG. 5 is a schematic diagram of a control packet used in the transfer of data between the processing unit and the hand-held data collector;

FIG. 6 is a flow diagram of the sequence of operations which occurs when the data collector is switched on;

FIG. 8a is a representation of an order machines screen for the PLACE mode and FIG. 8b is a similar representation of an order screen but for the PICK mode;

FIG. 9 is a display of the ID screen;

FIG. 14 is a flow diagram of the steps involved in generating a review screen;

FIG. 15 is an example of a display of a review screen with machine ID on;

FIG. 18 depicts an example of a notes screen.

DETAILED DESCRIPTION OF PREFERRED EMBODIMENTS

Before a detailed technical description of the diagrams is given, it will be understood that the drawings will be referred to generally in sequence but the description will also be described with respect to various functions performed by the operator using the hand-held data collector in order to best illustrate the structure and functioning of the embodiments of the present invention.

Figure 1:
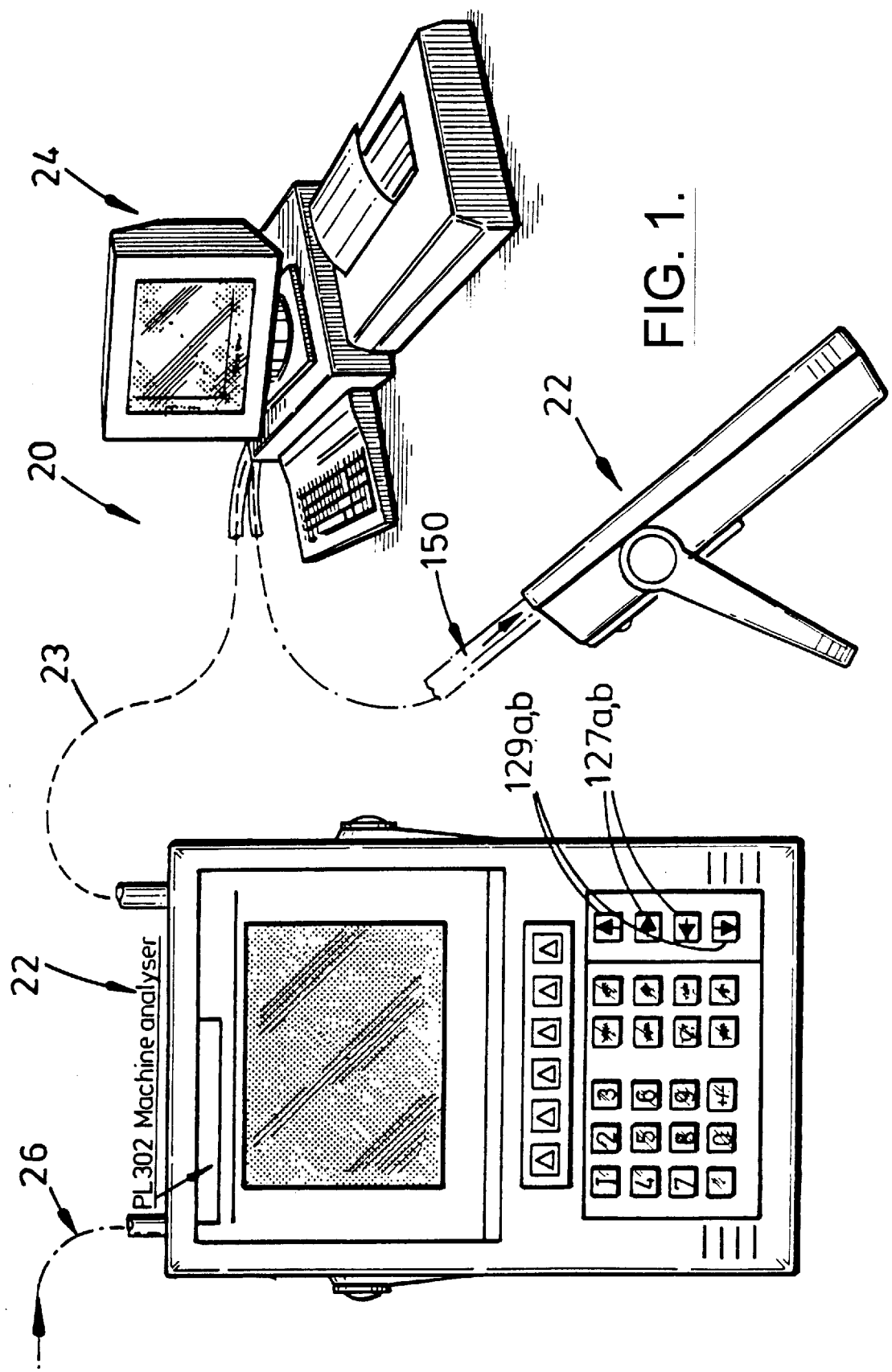
FIG. 1 is a diagrammatic view of a data collection system in accordance with an embodiment of the present invention.

Reference is first made to FIG. 1 of the drawings which depicts a data collection system 20 in accordance with an embodiment of the invention which consists of a hand-held PL302 data collector, generally indicated by reference numeral 22, shown coupled by a RS232 hardwire serial link 23 to a computer processing station in the form of a PC generally indicated by reference numeral 24. The data collector 22 is shown coupled to a measurement sensor 26 which can be of any suitable form such as a vibration sensor, pressure sensor, temperature sensor or the like for logging data from a plurality of machines.

A database of all the measurement points in a particular plant is created on the computer 24. Each measurement point is specified in terms of its location in the plant and a plant consists of a number of trains where each train consists of one or more machines and each machine is made up of one or more points. Each measurement point in a plant is therefore uniquely identified as "train:machine:point". As the user creates the plant database he also defines the type of measurements required at each point. Therefore, the sensing includes specifying what is being measured, for example acceleration, velocity, volts, pressure temperature, vibration, transducer sensitivity and other data collector settings. The plant database is generally created once per plant and is normally updated when new machines are installed or when measurement parameters require to be changed.

It will be appreciated that the database is created in the PC by the user because there is flexibility to identify readily the various parameters required for the machines which can be up to 400 in number.

The next stage in obtaining measurement data is for the user to create on the PC 24 a measurement set. In this regard the user selects the machines from the plant which he wishes to be measured. No measurement order is implied in the selection and several measurement sets may be created from the same plant. It will be understood that once created a measurement set can be used on many occasions with some minor editing.

Once the user has selected a measurement set in the PC and connects the PC 24 to the data collector shown in FIG. 1, the points in the set are transferred from the PC 24 to the data collector 22 along the RS232 serial link 23. It will be understood that the points which make up the measurement set are transferred in an arbitrary, for example random, alphabetical or numerical order. It should also be clearly understood that there is no predetermined schedule or order transferred with the measurement points as when they are received by the hand-held data collector 22 the user is free to group or create an order in which the data is collected. Points within a machine are grouped together but the order in which the machines is transferred is unimportant.

Once the data is downloaded from the PC 24 into the hand-held data collector 22, the RS232 serial link 23 is disconnected and the user then takes the data collector 22 into the plant. As will be later described, when the user wishes to initiate data collection he displays firstly the "order machines" screen on the display when the user selects a measurement set. This screen is used by the user to select the order in which measurements will be taken. Thereafter the user chooses the order in which the machines will be visited and the order of points within the machines is as downloaded to the data collector. The order chosen by the user is stored with the measurement set and the data collector and is displayed as the default selection whenever the "order machine" screen is used. It will be understood that default order is simply the order of download.

Once the measurement order has been selected, the user may then gather data. This operates as with a conventional PL302 data collector with the data collector displaying details of the next point to be measured. The data collector uses the selected collection order to determine what machine should be displayed next.

It will be understood that the user can skip measurement points at both the point and machine levels. The data collector uses the selected machine order instead of the order of download when determining which point to display next. When skipping machines, the user is shown details of the first point in each machine.

It will also be understood and will be later described in detail, as an additional feature, an extra "select machine" screen can be displayed whenever the next point is on a different machine from the current point. This would occur after gathering data at the last point on the machine, when skipping points forward from the last point on the machine or backward from the first point on the machine and also when skipping machines. This screen would show a list of machines as ordered in the "order machines" screen and would enable the user to manually override this selection if desired.

Figure 2:
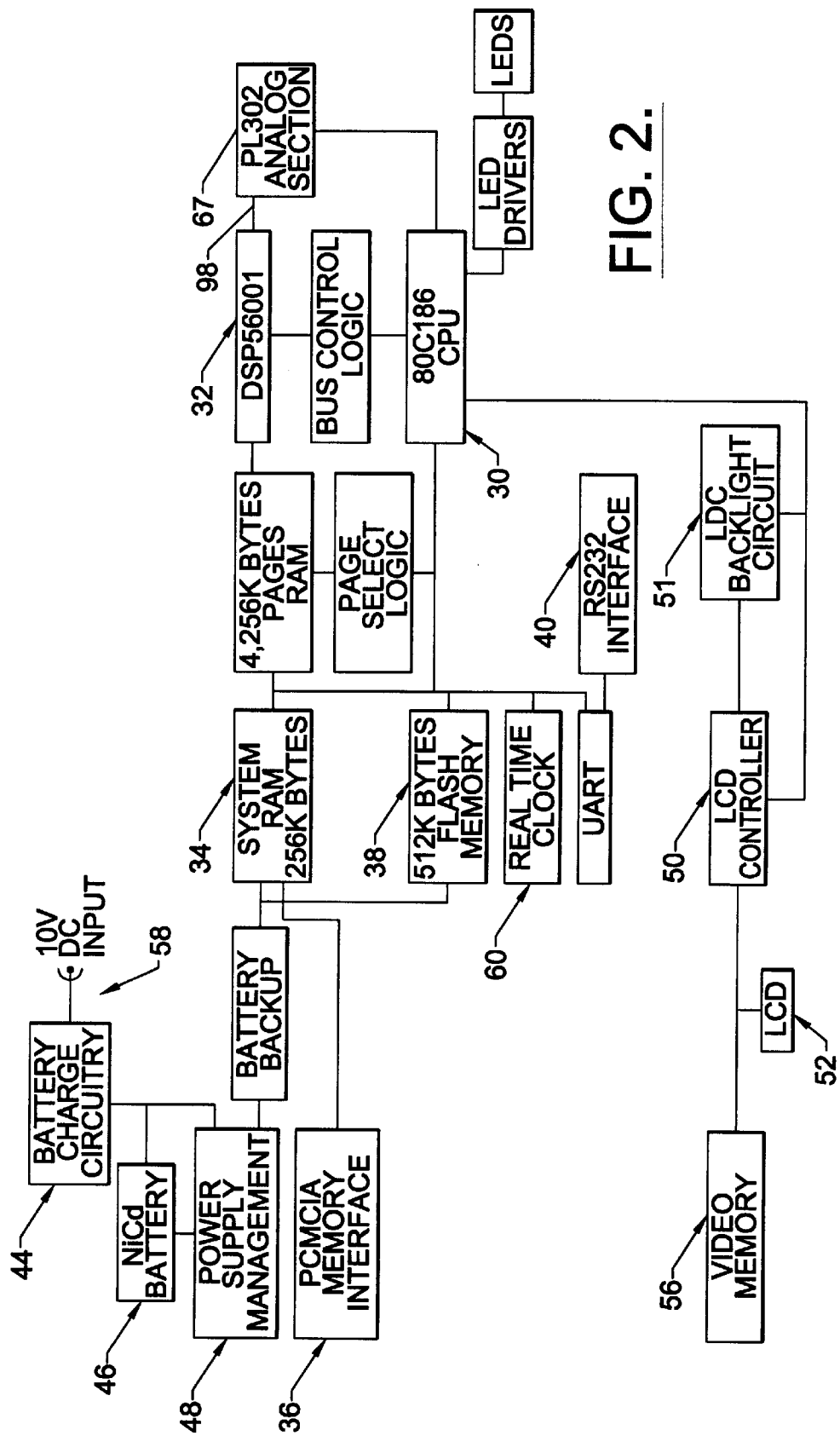
FIG. 2 is a block diagram of the circuitry used in the hand-held data collector shown in FIG. 1.

Reference is now made to FIG. 2 of the drawings which is a block diagram of the digital hardware in the PL302 data collector 22. The digital hardware includes an 80C186 microprocessor, indicated by reference numeral 30, which handles the memory storage display and housekeeping functions and a Motorola DSP 56001 processor 32 which is used to perform the various signal processing tasks. Battery-backed static RAM is used to store measurement and user configuration data. The battery-backed static RAM consists of 256 kbytes of system memory 34, 512 kbytes of user memory and 384 kbytes of shared user memory which can be switched in and out of the 80C186 memory space. This can be accessed by the Motorola microprocessor DSP56001 also. Also part of this page memory space is the PCMCIA memory card interface which can support up to 4 megabytes of memory. In addition, there is 512 kbytes of flash memory 38 available for code storage which can be pre-programmed within the unit. The RS232 interface 40 is coupled via a universal asynchronous receiver transmitter (UART) 42 to the memory 34 and this implements the interface for data transmission and code upgrades. In addition, it will be understood that the digital section includes a battery charge circuit 44 coupled to a nickel cadmium battery 46 and a power supply management circuit 48. As mentioned above, the display is under the control of the 80C186 microprocessor 30 and includes an LCD controller 50 for LCD display 52, and LCD back-light circuit 54. A video memory 56 is also coupled to the LCD controller 50.

The power supply circuitry 48 controls the power on and low voltage reset of the 80C186 microprocessor 30, the battery-back up of the static RAM 34 and the trickle charge of the internal nicad battery 46 and the operation of the unit 22 from an external 10 V d.c. supply 58.

All the analogue and digital peripheral devices are input/output mapped and these comprise a real-time clock 60 which is used to time stamp data records, a keypad interface interrupt controller, which is part of the 80C186 microprocessor which handles various interrupt sources, a DSP host port which is actually the Motorola processor host control interface, a page register for the memory/PCMCIA page control register and analogue control latches for the front-end analogue board control registers. The 80C186 microprocessor 30 uses a 16 bit data bus which is connected to all memory and peripherals. Any 8 bit peripheral is connected to the low 8 bits of this bus. The 12 bit ADCs 94,96 are connected to the high 12 bits of the 16 bit data bus. The DSP56001 32 uses a 24 bit data bus. The ADCs 94,96 are connected to the most significant 12 bits of this bus. The 384 K of shared memory which is used by the DPS56001 is arranged 24 bits wide. The 80C186 reads this as 32 bit wide memory (i.e. as two successive 16 bit words), with the low 8 bits of the 32 bits being unused. The logic which performs this mapping also swaps the Motorola byte order to the intel byte order allowing 24 but Motorola data words to be read as the most significant 24 bits of a 32 bit intel long data word.

Both the Motorola processor and the 80C186 microprocessor are coupled to the PL302 analogue section 62 which will now be described in more detail.

Figure 3:
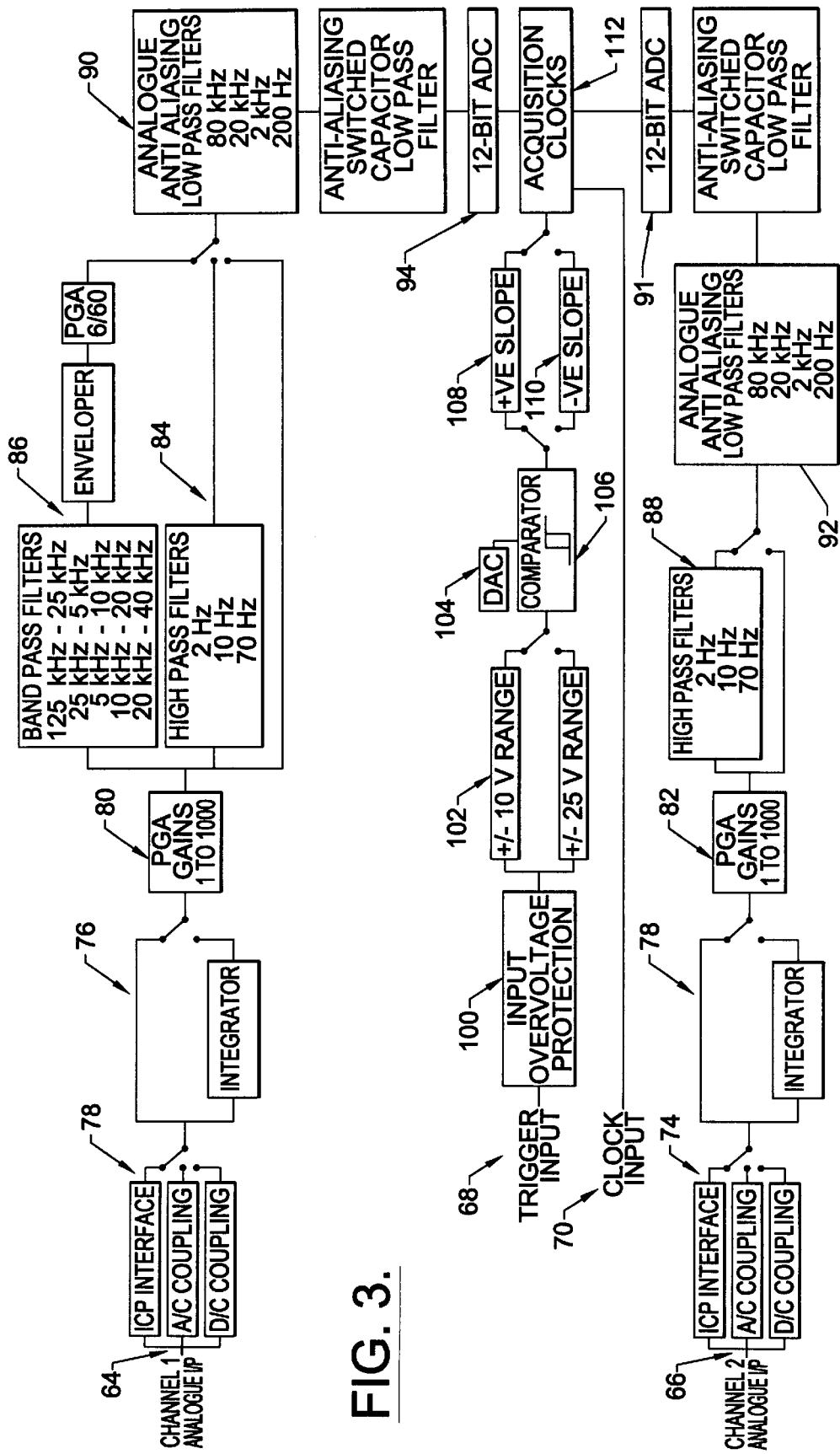
FIG. 3 is a more detailed block diagram of the analogue section of the circuitry referred to in FIG. 2.

Reference is now made to FIG. 3 of the drawings which depicts the analogue circuit 62 shown in FIG. 2. The analogue circuit 62 comprises two analogue data acquisition channels 64, 66, one external trigger input 68 and one external clock input 70. The analogue channels 64, 66 each have their own AC/DC and ICP interface coupling options 72, 74 respectively, analogue integrators 76, 78 respectively and programmable amplifiers 80 and 82 which have gains selectable from 1 to 1,000. The channel 1 signal path 64 has a selectable analogue high-pass or envelope filters 84, 86 respectively with a choice of bandwidths. The channel 2 signal path 66 has only high-pass filters 86. Each channel 64, 66 has its own analogue and switched capacitor anti-aliasing filters 88, 90 respectively and 12 bit analogue to digital convertors (ADC) 94,96 respectively. All filter and gain selections in each channel are performed from the 80C186 microprocessor through various control latches and digital analogue convertors (DACs) (not shown). The ADCs 94, 96 interface to the Motorola DSP 56001 digital signal processor 32 via a twelve bit digital bus 98 shown in FIG. 2 of the drawings. The trigger input 68 comprises input protection circuitry 100 and a ±10 V or ±25 V input range selector generally indicated by reference number 102. A digital analogue convertor (DAC) 104 sets the trigger threshold and a comparator 106 produces a digital output once a trigger input crosses this threshold. An exclusive OR gate (XOR) is used to allow the 80C186 microprocessor to select a positive or negative slope 108, 110 respectively as a required trigger input. Once the trigger occurs the acquisition clocks 112 are guaranteed to start within the precise interval. The clock input 70 is available which can be used in place of internally generated sample-rate clock.

It will be understood that the route or tour sequence is described, in this embodiment, in terms of single channel measurements and channel 64 is used to achieve this. The second signal channel 66 is used, in this embodiment, in the analyser mode only and will not be described further. However, it will be appreciated that two or more channels could be used to receive measurements. It will be understood that the trigger input or clock input are external inputs for synchronising measurements.

Transfer (XFER) accesses the data transfer screen A. Routes may be downloaded to the data collector using an RS232 link, or may be written directly on to the PCMCIA memory card. When using the RS232 option then a packet based protocol is used to transfer data between the PL302 and a PC. The PC is in control of the transfer process and sends down a sequence of packets. These packets fall into two types—queries and commands. Query packets request the data collector to return information, again in a packet form, for example a request may be made for all spectral data which has been gathered as part of the current route.

Control packets allow the PC to configure the data collector, for example to clear the existing contents of memory and store a sequence of measurement points as a new route.

Within the XFER screen, the user may gather RS232 settings and may also abort data transfers.

Figure 4:
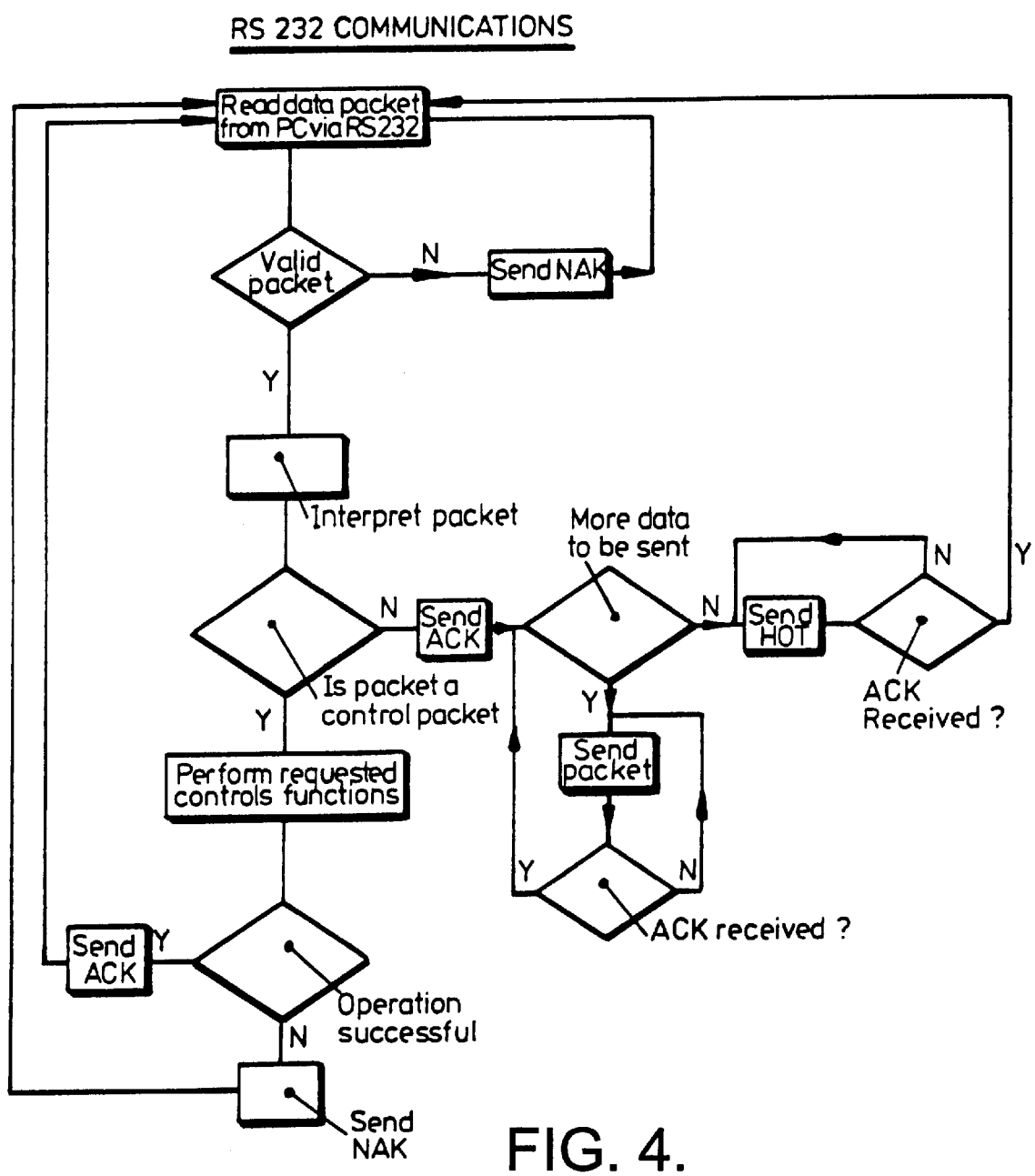
FIG. 4 a flowchart of the RS232 communication protocol used in transferring data between the computer processing unit and the hand-held data collector shown in FIG. 1.

Reference is now made to FIG. 4 of the drawings which is a flowchart of the RS232 communication protocol used in transferring data between the PC24 and the data collector 22 As shown in FIG. 1. When the packet is sent from the PC to the data collector the packet is first read and checked to see whether it is a valid packet. If the packet is not a valid packet a NAK signal is sent which has an ASCII character value of 6. The valid packet is ascertained using a check sum/end character. If the packet is valid it is interpreted to see whether the packet is a control packet. As will later described, if the packet is a control packet the requested control functions are performed and if the operation is successful ACK ASCII signal is sent to the PC. If the operation is not successful a further NAK ASCII character is sent to the PC. If the packet is not a control packet then an ACK ASCII character is sent which checks whether further data is to be sent. This continues until all the data is sent and the operation is successful.

Reference is now made to FIG. 5 of the drawing which is a schematic diagram of a control packet for configuring the data collector. The control packet introduces certain fields to allow text for train IDs to be set up so that the train and machine ID is used to determine whether a new machine is requested. Within the control packet some fields are for information only for example field 7.5 which identifies 16 characters of text and field 7.3 which relates to the point ID. Other fields control or configure the measurement at the point for example point type identified 7.9 on hardware settings at 7.10 and sensitivity 7.20.

It will be understood that the control packet sent from the PC sets the PL302 up for subsequent measurement as will later be described in detail. There is another type of packet known as the host request/query packet which is a request from the PC to the PL302 to send information back to the PC and there is a third type of packet, known as a data packet, which is the PL302's response to the host request/query packet.

In response to the control packet being sent to the data collector 22 from the PC 24 the data collector goes through various operations and internal procedures to create the various screens for the user in order to create a tour sequence or route to be followed in the plant. This is best explained with reference to various screens which are created for the user so that the reader can best understand the operation of the data collector during a tour.

Figure 6:
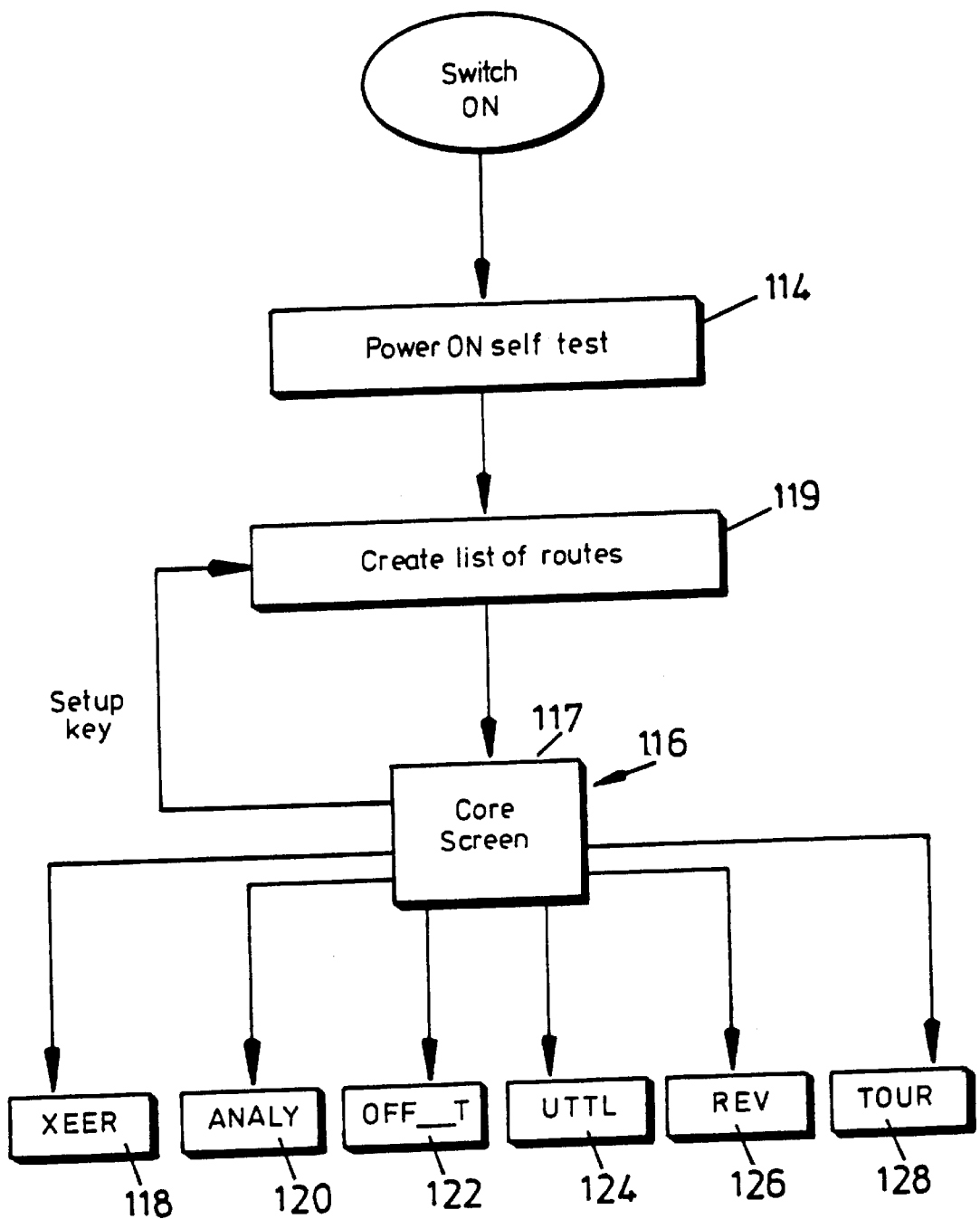

In this regard reference is now made to FIG. 6 of the drawings which is a flow diagram of the sequence of operations which occurs when the data collector is switched on. When the data collector 22 is switched on the software first performs a brief self test of the flash memory contents and the RAM 34. A 512 kilobyte portion of the battery backed static RAM 35 is treated as a diskdrive by the software. This "disk" is checked to ensure that it has been formatted then its contents are searched for any routes that might have been stored. If a PCMCIA memory card is detected then its contents are similarly checked. This list is depicted as box 114 on FIG. 6.

A list of route names is built-up and the core screen depicted by reference number 116 allows the user to select one of these routes for further operations. The up/down keys are used to move the cursor from one route to another in the list where the left/right keys move through the list one page at a time.

As will be later described, a status box is updated with each move to show some information in the currently selected route, such as the number of points in the route, the number of points which remain to be measured in the route, and the point number within the route which was last accessed. If the user has not selected a route before then this number is set to the first point in the route. The set up key is used to rebuild this list of routes and may be used anywhere and may be used from anywhere with in the data collector menu structure. Six key options are available from the core screen 116 using the software keys generally indicated by reference numbers 118 to 128 shown the reverse type face on FIG. 6. The core screen 116 is shown with a heavy boundary 117 and all other screens are depicted in this way; this is what the user actually sees as a screen. The other box 119 displayed is not seen by the user but are internal to the operation of the data collector.

Figure 7:
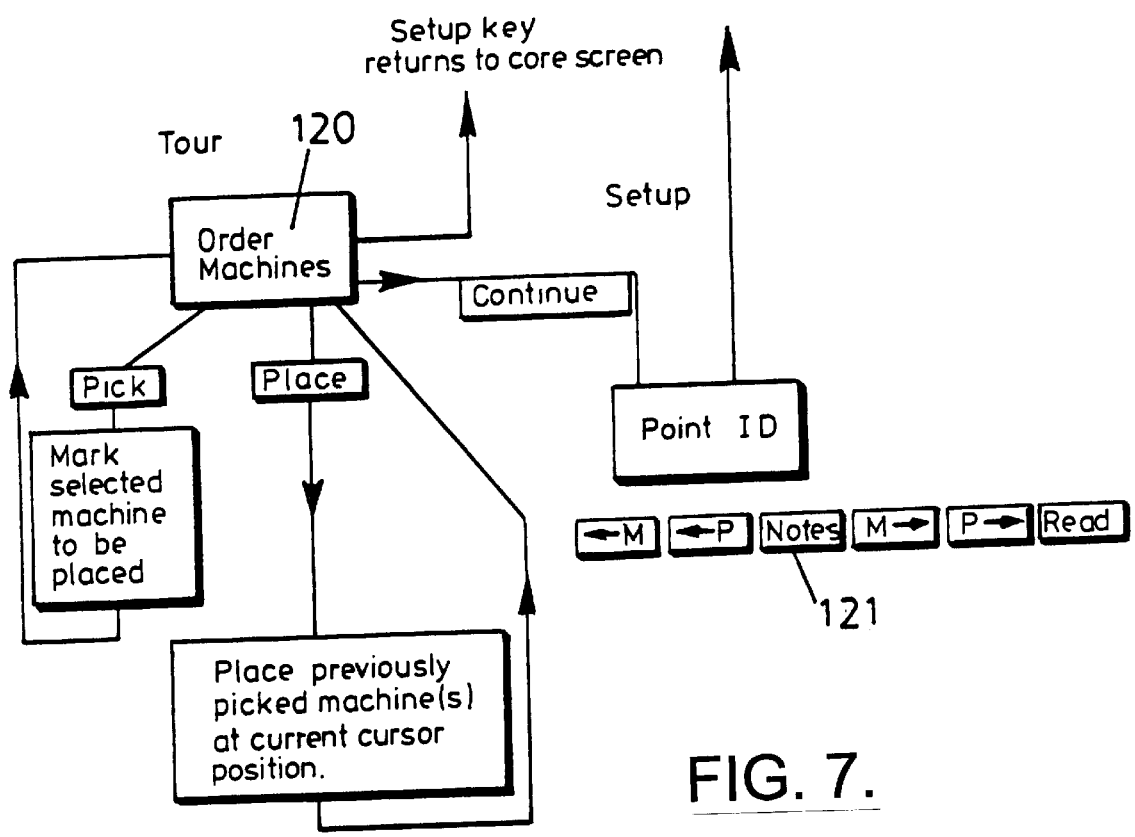
FIG. 7 is a flowchart of operations which occur in the data collector when the tour button is pressed.

Reference is now made to FIG. 7 of the drawing which is a flowchart of the operations which occur in the data collector when the TOUR button is pressed. For ease of description FIG. 7 will also be described combination with FIGS. 8a, 8b and FIG. 9. The TOUR key allows access to the usual method of performing the measurements which have been set up in the route. The user is firstly presented with the select order or order machines screen 120. This screen displays a list of train and machine names for each machine in the route. The left/right keys 127a, 127b (FIG. 1) move through this list one at a time while the up/down keys 129a and 129b move from machine to machine.

This list is created to form a new route from the download data. However if the route has been used within the data collector before and machine orders were stored in memory by the user, the these are available for re-use. The data collector allocates some space for the storage of ordering information. This is not immediately erased when the routes are cleared from the instrument and, if the route name matches the route name of one of the previously stored lists, then the user will be prompted as to whether he wishes to use one of these previously stored lists or reorder from scratch. Thus, multiple configurations can be saved for a single route, allowing different operators to use their own preferences for a route measurement order.

There are two modes of ordering machines in the order list screen. The default is one where the machines are PICKED and PLACED and this is known as the PLACE mode and the second mode is known as the PICK mode. These modes are described below with reference to FIGS. 7, 8a and 8b.

With reference to FIG. 7 and 8a in the PLACE mode the pick key is used to choose the machine highlighted by the cursor. When a machine has been 'picked' its name will be displayed in the select box above the softkeys. The cursor then changes from a reverse video line to two arrow characters at the beginning and end of the train/machine name. The PICK softkey changes to PLACE. The cursor can then be moved to another position in the list (using the cursor keys) and the PLACE softkey used to move the selected machine to the new position in the list. When PLACE is pressed the selected or 'picked'machine is placed at the current cursor position. The softkey changes back to PICK, the select box is cleared and the cursor changes back to the normal reverse video line.

Reference is now made to FIG. 7 and FIG. 8b to explain the PICK mode. In the PICK mode when the order list screen is entered, the cursor is moved to the machine which is to be placed at the top of the list. The PICK softkey is pressed and this machine is moved to the top of the list. The cursor is then moved to the machine which is to be placed at the second top position in the list. The PICK softkey is pressed and this machine is moved. This process is continued until all the machines have been ordered, i.e. PICK 3rd, PICK 4th, PICK 5th machine etc. In the UTIL screen the option FTMS PLACE/PICK is available. This allows the user to select the mode of ordering machines in the order list screen—PLACE mode or PICK mode. The default is PLACE. The other keys appearing on the screens shown in FIGS. 8a, 8b are as follows:

SAVE:

This mode allows the user to save the current order list in the PL302's internal memory. When pressed, a pop-up menu appears:

---

Select Index for Order List
1
2
3
4
5

OK

---

This user uses the UP/DOWN keys to select the index number #1 to #5 and presses OK to save the current order list with this index. If an order list was previously stored under the index a message "List #n exists, press ENTER to overwrite" appears. If ENTER is pressed, the current list is saved overwriting the previous one, otherwise the save is aborted.

RCALL:

This key allows the user to recall a previously stored order list from the PL302's internal memory. When pressed, a pop-up menu appears:

```
Previous Order List found
  for tour TOUR ID
User Previous Order List
#1
#4
5
RESET ORDER
        OK
```

This lists all the index values for the previously stored order lists e.g. in the above example lists exists for indices #1, #4 and #5. The option "RESET ORDER" i.e. return to order as downloaded from PC is also given. This user uses the UP/DOWN keys to select the index number or RESET ORDER selection and presses OK to recall the current order list with this index.

When a tour has been newly downloaded the user is given the option to recall any order lists previously stored for this tour. It should be understood that the tour may have changed from when the order list was stored: machines may have been added or deleted. The user can still recall previously stored order lists in this case. Any new machines in the tour which did not exist when the order list was created are put to the end.

HOME:

This moves the cursor to the first machine in the list, i.e. the one at the top of page 1.

*PT:

When the order machine screen is entered a * is displayed at the end of the currently selected machine name. Pressing the *PT softkey moves the cursor to this machine. This can be useful if the machines have been re-ordered and the user wants to return to the original machine which was selected on entry to the screen.

CONT:

Continue with the tour. The user is taken to the first tour point in the currently selected machine, i.e. the machine which the cursor is on.

The method of marking which machines are selected may be made by displaying the machine name in a separate "selected" window as best seen in FIG. 9 or by displaying a special symbol beside the machine name in the list.

Figure 10:
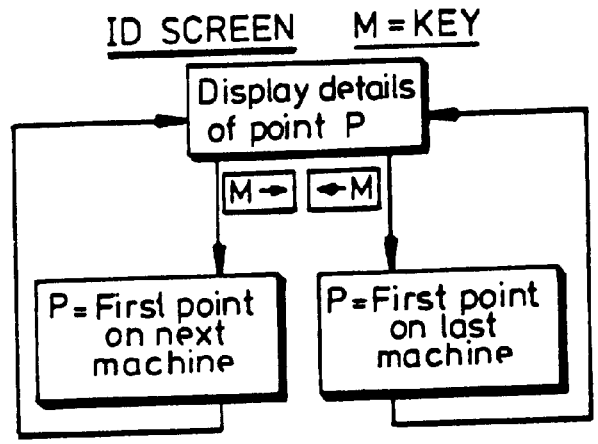
FIG. 10 is a flow diagram of the sequence of events used to create the ID screen shown in FIG. 9.
Figure 11:
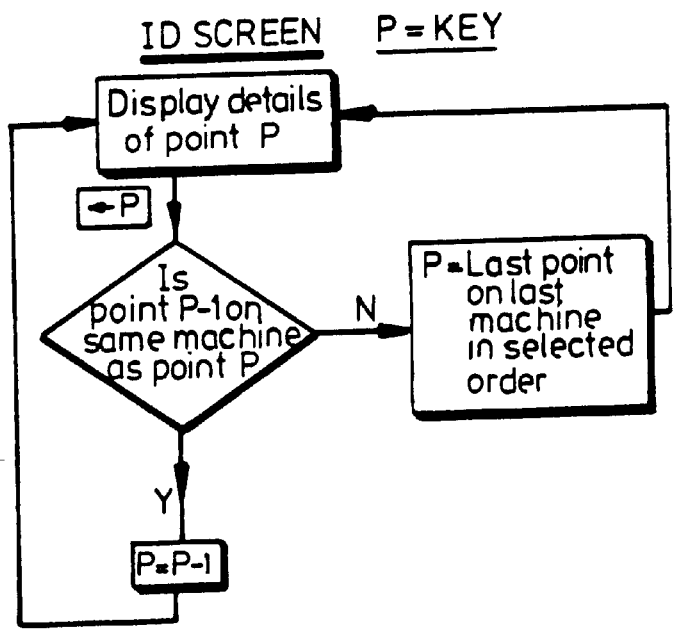
FIG. 11 is a flow diagram of the sequence of events for the ID screen using the <-P key.
Figure 12:
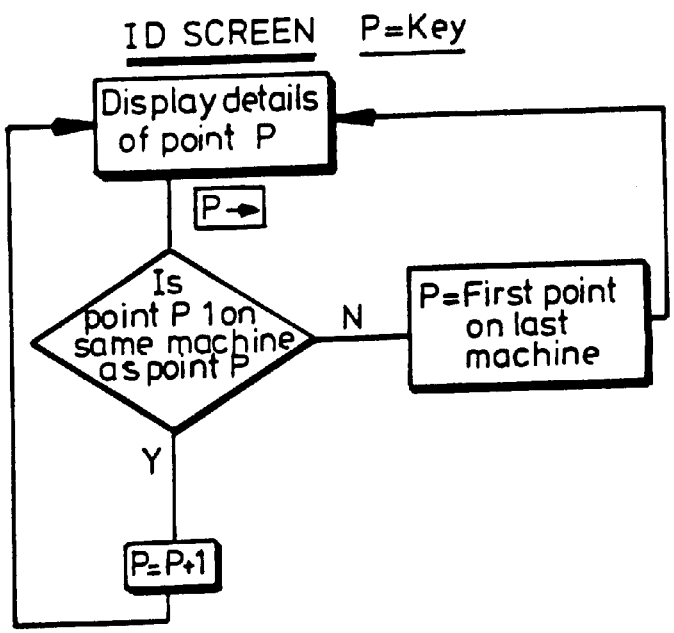
FIG. 12 is a similar ID screen as for FIG. 11 using the P-> key.

FIG. 10 is a flowchart of steps involved when the M-> key is actuated, i.e. when the data collector skips to the next machine without collecting data at the current point. Similarly, FIGS. 11 and 12 are flowcharts of activity when softkeys <P-r,P-> are pressed, that is when the data collector skips to back to the previous point or to the next point without collecting data from the current point respectively.

Figure 13:
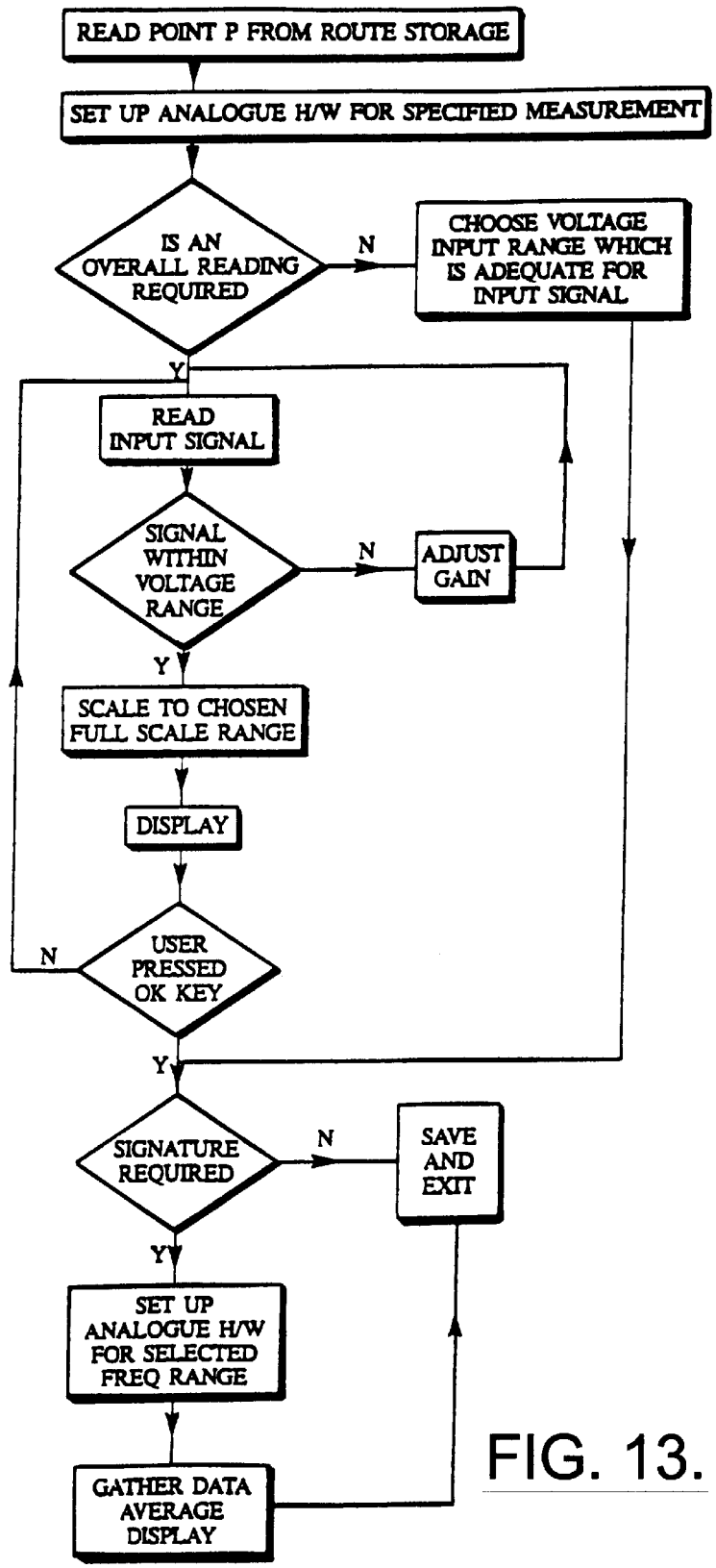
FIG. 13 is a flow diagram of the data acquisition steps which occur on actuation of the read key.

Once the route is created the user then proceeds to take the data collector to the machines in the route, in the order created, and then proceeds to take measurements from each machine on the route if desired. Data acquisition i.e. measurements are taken using the READ key and this will be best explained with reference to the flowchart shown in FIG. 13 of the drawings.

The data collector uses the selected order and displays details of the next point to be measured. The READ key performs the measurement as specified in the point set up. This set allows for example, the transducer sensitivity to be set, the measurement type (G's, mm/s, mils, V, etc.) to be chosen.

The measurement process is done in two stages. Firstly an overall measurement is taken and displayed on a continuously updated bar graph display. The actual voltage range used is altered to the amplitude of the signal being measured, and the results are scaled based on the measurement type and transducer sensitivity to the specified full scale range in the chosen units. The user has to wait several seconds for the measurement to settle at which point he may accept the measurement and move on the second stage, the signature collection if specified.

If no overall measurement is specified then a several second delay is introduced to allow the voltage range to be chosen prior to gathering signature only data.

It will be appreciated that time or spectral signatures may be acquired. In both cases the input voltage range is fixed at the value chosen during the overall measurement. The data is gathered, processed and displayed as an amplitude verses time or frequency plot. Cursor options are available to allow the user to inspect the data. The OK key causes the results to be saved and advances to the next point ID screen.

It will be appreciated that the measurement procedure using the read key is repeated for each point in turn until the completion of the tour sequence on route.

As described above, the user can skip measurement points at both the point and machine levels. The data collector uses the selected machine order rather than the order of download when determining which point to display next. When skipping machines, the user is shown details of the first point on each machine.

As an additional feature, an extra "select machine" screen may be displayed whenever the next point is on a different point from the current point. This would occur after gathering data at the last point in a machine, when skipping points forward from the last point on a machine or backward from the first point on a machine, and when skipping machines. This list would show a list of machines as ordered in the "order machines" screen, and would enable the user to manually override this selection, if desired.

Figures 14, 15:
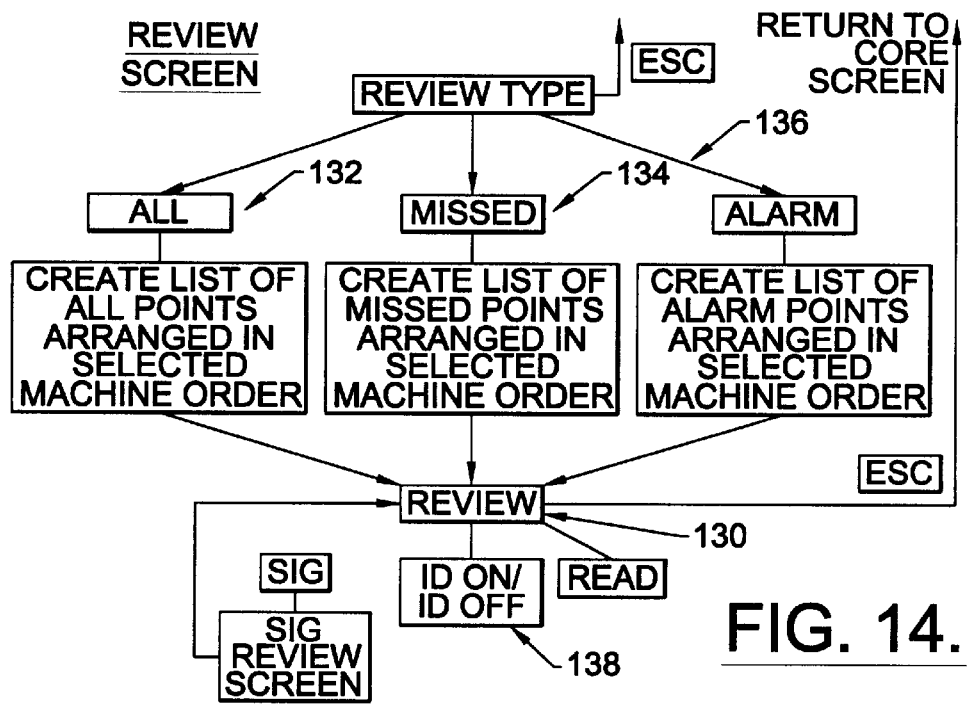

Reference is now made to FIG. 14 which is a flow diagram of the steps involved in generating a review screen 130. It will be understood that the review type screen allows the review screen to be used with three different lists of points; the current route-all-points 132; missed points only 134 or gathered points 136 whose reading exceeds an alarm threshold. This is best seen in FIG. 14 of the drawings. Exiting from the review screen 130 returns to the core screen 116. The list of points to be displayed on the review screen is best shown by the screen in FIG. 15 with the machine ID on. The list of points displayed is built-up in currently selected order of machines.

The review screen 130 gives a different view on the route (and any off-tour points). Points within the route are listed page by page and the left/right keys are used to go back/forward through these pages while the up/down keys position a cursor over the currently selected points. The machine and point names are shown on the screen list in FIG. 15. Further details on the point are displayed using the ID ON softkey. Once this information is displayed a further press of the soft key labelled ID OFF will clear it.

If signature data has been gathered at this point then the SIG softkey, when pressed, will graphically display this. Various cursor options are provided allowing the user to inspect this data in detail.

The OK key at this stage returns to the review screen and the READ key allows the measurement to be taken as in TOUR or OFF TOUR mode. The ESC key returns to the review screen.

Figures 16, 17:
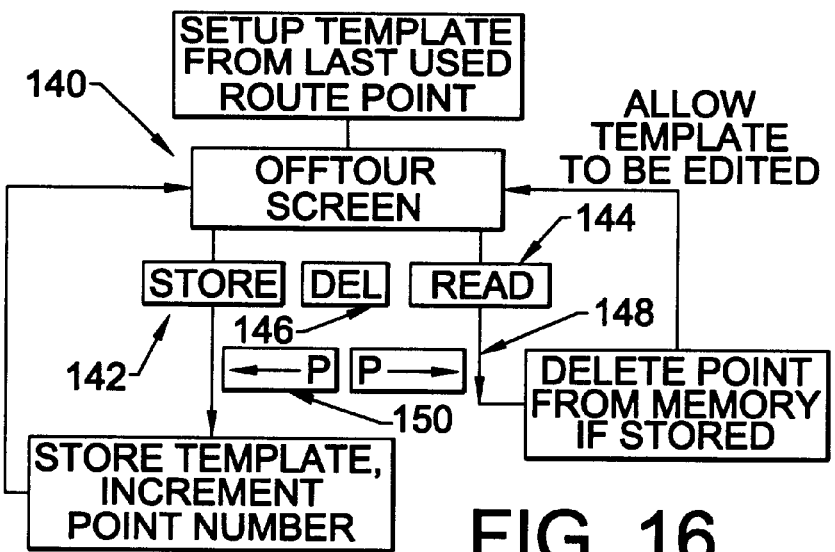
FIG. 16 is a flowchart and sequence of events used for creating an off tour screen.
FIG. 17 depicts an example of an off tour-screen.

Reference is now made to FIG. 16 of the drawings which is a flowchart of the OFF TOUR screen and to FIG. 17 which depicts the contents on the OFF TOUR screen. This screen is selected by the user actuating button 122 shown on FIG. 6 which deletes the core screen and brings up the OFF TOUR screen 140. The OFF TOUR screen 140 allows the user to set up measurement points within the data collector, to perform the selected measurement and store the results as unscheduled measurements that are part of the currently selected route. In other words, this allows the user a way of appending extra data to the route. There are two main stages involved in the OFF TOUR screen. The first stage is the template editing stage which is the setting up of the point to be measured and the second stage is the measurement stage, as already described with reference above using the READ key.

The template editing stage consists of setting of OFF TOUR template to a last used point from the route. This allows the user to easily replicate a measurement made in the route mode and to selectively adjust measurement parameters from this set up.

Once the user has edited the measurement setting, these can then be stored in two ways. The STORE softkey 142 saves the settings without gathering any data, whereas the READ key 144 gathers and processes data before storing the settings and data.

In both cases, the OFF TOUR template is advanced to the next stored point. If no next point exists, then a new template is created by copying the last settings and incrementing the point number. The delete (DEL) softkey 146 is used to delete the settings and data associated with the current OFF TOUR point. The <-P and P-> keys 148,150 are used to move through a stored sequence of OFF TOUR points.

Reference is now made to FIG. 18 of the drawings which depicts the display showing the NOTE screen. The data collector 22 provides the facility to take up to six coded notes at any single measurement point. The NOTE screen is accessed by pressing the NOTE softkey 121 where the user is presented with the first of several pages of user—defined coded notes shown on the screen example on FIG. 19. The UP/DOWN keys are used to index through the coded notes one at a time. However, if the user types in the number of the coded note he can access that code note directly from the keypad. Once a particular coded note has been reached, either by the cursor or by entering the number, then pressing the ENTER hardkey will store that coded note against the current measurement point. For example, if there was abnormal noise at the particular measurement point, the user would press key 5 and this would appear against that measurement point. Once a coded note has been selected, a symbol appears on the left hand side of the display against that code indicating the selection.

The ENTER hardkey is implemented in the toggle fashion, that is, a subsequent press of the key deletes the coded note from the measurement point. The ESC softkey is used to exit the NOTE screen and return to the previous screen.

The data collector also includes a utilities key 124 (FIG. 6) which allows the user to specify several display and data collection options including the choice of units (Hz or CPM) and whether the collector updates the display after each average or only when all averages are complete. This mode returns to the core screen 116.

It will be appreciated that various modifications may be made to the apparatus and methodology hereinbefore described without departing from the scope of the invention. The particular flowcharts and screens described are examplary only and it will be appreciated that various other screens with machine orders may be implemented according to the present invention. The uploading and downloading has been described using the RS323 serial link. This may also be achieved using a memory card or disk 150 best shown in FIG. 1. The memory card 150 when plugged into the PC 24 receives the list of machines and removal to this card and insertion into the data collector 22 enables data collector 22 to receive the information from the card which is then stored in the data collection memory. Once the TOUR sequence is created by the user, measurement information is then stored for each machine in order and the information is uploaded to the PC 24 by simply removing the card and inserting it into the computer when its contents are read. Thus, this allows for trend analysis and any other analysis to be made in the same way as with the hardwire link.

It will therefore be appreciated that the principal advantage of this invention is that it allows the user flexibility and editing the TOUR sequence in the field. The user is not constrained to a predetermined schedule and this means that the user is able to create a TOUR which caters for situations where the machine environment has been changed, for example, machine relocation or machine addition or removal.

It will also be understood that the data collector can be used with any type of personal computer. Personal computer includes, but is not limited to, lap-top, palm-top and notebook sized computers. In fact, any computer processing unit in which data bus information can be entered for subsequent transfer to a hand-held data collector.

I claim:

1. A data collection method for collecting maintenance data in a portable data collection unit from a plurality of machines in an inspection sequence during an inspection tour, said data collection method comprising the steps of:

sequentially transferring identifications of maintenance data measurements to be obtained from said plurality of machines during an inspection tour to said portable data collection unit, in an arbitrary order which is independent of an inspection sequence; and reordering the transferred identifications of maintenance data measurements to be obtained from said plurality of machines during an inspection tour, from said arbitrary order into an inspection sequence, in response to inspector input to said portable data collection unit, such that an inspection sequence is determined in said portable data collection unit by the inspector.

2. A data collection method according to claim 1 wherein said reordering step is followed by the step of:

collecting maintenance data in said portable data collection unit during an inspection tour according to the reordered inspection sequence.

3. A method according to claim 1 wherein said arbitrary order is one of a random order, an alphabetic order on a numeric order.

4. A data collection system for collecting maintenance data from a plurality of machines in an inspection sequence during an inspection tour, said data collection system comprising:

means for assembling identifications of maintenance data measurements to be obtained from said plurality of machines during an inspection tour;

a portable data collection unit;

arbitrary order transferring means, responsive to said assembling means, for transferring said identifications of maintenance data measurements to be obtained from said plurality of machines during an inspection tour from said assembling means to said portable data collection unit, in an arbitrary order which is independent of an inspection sequence; and arbitrary order reordering means in said portable data collection unit, for reordering said arbitrary order into an inspection sequence, in response to inspector input to said portable data collection unit, such that an inspection sequence is determined in said portable data collection unit by the inspector rather than in said assembling means.

5. A data collection system according to claim 4 wherein said arbitrary order transferring means comprises one of a hardwired link on a removable memory card.

6. A data collection system according to claim 4 wherein said arbitrary order is one of a random order, an alphabetic order on a numeric order.

7. A portable data collection unit which collects maintenance data from a plurality of machines in an inspection sequence during an inspection tour, said portable data collection unit comprising:

an interface which accepts from external to said portable data collection unit, identifications of maintenance data measurements to be obtained from said plurality of machines during an inspection tour, in an arbitrary order which is independent of an inspection sequence; and wherein said portable data collection unit reorders said arbitrary order into an inspection sequence, in response to inspector input to said portable data collection unit, such that an inspection sequence is determined in said portable data collection unit by the inspector.

8. A portable data collection unit according to claim 7 wherein said interface comprises one of a hardwired link a removable memory card.

9. A portable data collection unit according to claim 7 wherein said arbitrary order is one of a random order, an alphabetic order or a numeric order.

\* \* \* \* \*

UNITED STATES PATENT AND TRADEMARK OFFICE
CERTIFICATE OF CORRECTION

PATENT NO. : 5,956,658
DATED : September 21, 1999
INVENTOR(S) : McMahon

It is certified that error appears in the above-identified patent and that said Letters Patent is hereby corrected as shown below:

Title page, [56] References Cited, U.S. PATENT DOCUMENTS, line 5, "Sahami et al." should read --Sakami et al.--.

Column 14, line 49, "on" should read --or--.

Column 15, line 8, "on" should read --or--; line 11, "on" should read --or--.

Column 16, line 11, after "link" insert --or--.

Signed and Sealed this

Twenty-fifth Day of April, 2000

Q. TODD DICKINSON

*Attest:*

*Attesting Officer*     *Director of Patents and Trademarks*